Jan. 24, 1956   S. J. STEVEN   2,731,692
SWALLOWPROOF SAFETY PIN
Filed Nov. 3, 1952
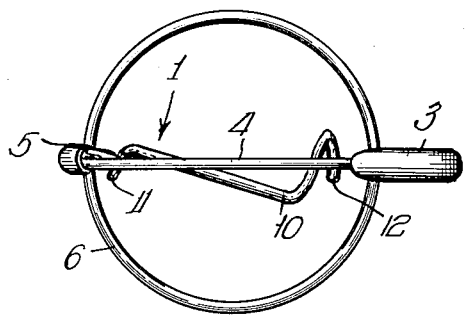
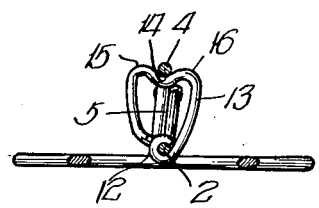
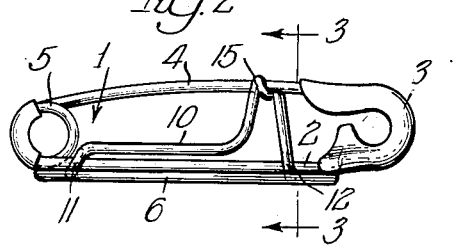
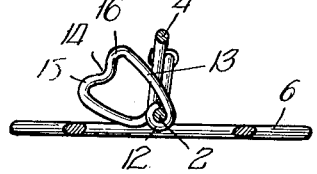
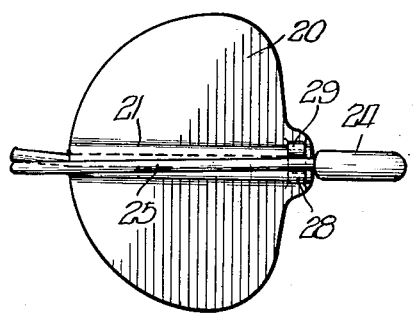
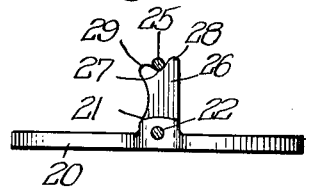
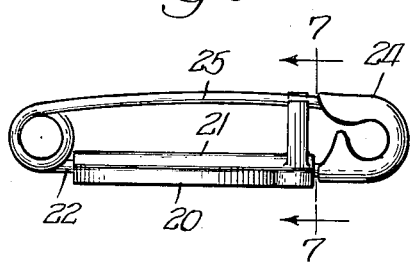
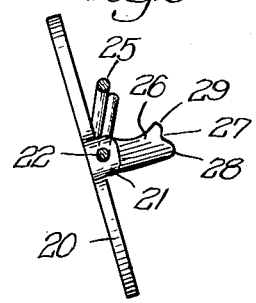
INVENTOR.
Steven J. Steven,
BY George H. Simmons
atty.

United States Patent Office 2,731,692
Patented Jan. 24, 1956

2,731,692

SWALLOWPROOF SAFETY PIN

Steven J. Steven, Brookfield, Ill.

Application November 3, 1952, Serial No. 318,374

2 Claims. (Cl. 24—157)

This invention relates to swallow-proof safety pins and has for its principal object the provision of a new and improved device of this kind.

It is a main object of the invention to provide a safety pin which is guarded in such a manner that it cannot be swallowed by an infant.

Another object of the invention is to provide a safety pin which when closed can be locked so that accidental opening of the pin is impossible.

Another object of the invention is to provide safety guards for safety pins which enhance rather than detract from the appearance of the pin.

Another object of the invention is to provide a safety pin that is guarded to make it swallow-proof and which can be manufactured at low cost without sacrificing quality.

Further objects of the invention not specifically mentioned here will be apparent from the description and claims which follow, reference being had to the accompanying drawings in which the preferred embodiment of my invention is shown by way of example and in which:

Fig. 1 is an underside plan view of a swallow-proof safety pin;

Fig. 2 is a side elevational view of Fig. 1;

Fig. 3 is a cross sectional view taken substantially along the line 3—3 of Fig. 2, looking in the direction of the arrows and showing the pin in locked position;

Fig. 4 is a view similar to Fig. 3, showing the pin unlocked;

Fig. 5 is a plan view of a modified form of the invention;

Fig. 6 is a side elevational view of the modification of Fig. 5;

Fig. 7 is a cross sectional view taken substantially along the line 7—7 of Fig. 6, looking in the direction of the arrows and showing the pin in locked position; and Fig. 8 is a view similar to Fig. 7, showing the pin unlocked.

Referring now to the drawing in more detail, particularly Figs. 1 to 4, inclusive, wherein there is shown an ordinary safety pin 1 having a back or stationary leg 2, on one end of which is fixed a keeper 3, and a movable or pin leg 4 that is engaged with the keeper when the pin is closed, and is tensioned by a spring device 5 to move the point of the pin away from the stationary leg 2, thereby to keep it securely seated in the generally U-shaped closed end of the keeper 3. Fixed to the stationary leg 2 of the pin is a wire annulus 6 which has a diameter of not less than one inch. The ring 6 is soldered, preferably with silver or hard solder, to the leg 2 of the safety pin, and being composed of wire, is of circular cross section and entirely free from any jagged edges which might scratch the baby or its handlers.

As will be seen in Figs. 1 to 4, I have provided a latch or lock 10, also formed of wire and containing loops 11 and 12, which encircle the stationary leg 2 of the pin so as to permit movement of the latch around that leg as an axis. The latch 10 contains an upwardly extending loop 13 which contains a recess or depression 14 in which rests the movable or pin leg 4 of the safety pin. As will be seen in Fig. 3, the latch contains humps 15 and 16 disposed on the opposite sides of the recess 14, with the hump 15 extending farther from the axis of stationary leg 2 than does the hump 16, this arrangement permitting movement of the latch into and out of engagement with the pin 4 from one side only. In Fig. 3, the latch is shown in position to lock the pin closed and in Fig. 4 in open position.

Figs. 5 to 8, inclusive, show a similar arrangement wherein the safety member 20 is formed of plastic which may be either clear or colored, as desired. The member 20 is of generally circular shape and has a diameter of not less than one inch. The member 20 contains a rib 21 which is perforated and through which the stationary leg 22 of the safety pin is passed. The safety pin is equipped with a keeper 24, as before, and with a movable or pin leg 25. As will be seen in Fig. 7, a locking member 26 that is integral with the member 20 projects upwardly and contains a recess 27 into which the pin 25 is registered. The end 28 of the locking member 26 projects farther from the axis of the stationary leg 22 than does the side 29, thereby limiting the movement of the pin 25 into and out of engagement with the recess 27 to one side only.

In the example shown in the drawings, the member 20 is essentially planar; however, the surface thereof opposite the rib 21 may contain a suitable design molded therein in relief, if desired. When composed of a somewhat flexible plastic such as the vinyls or butyrates, the member will flex rather than break, and even when composed of a more fragile plastic such as polystyrene, the member is not apt to become broken with ordinary use.

In either modification of the invention, when it is desired to open the pin, the latch is rotated out of engagement with the pin or movable leg of the safety pin. In the modification shown in Figs. 5 to 8, inclusive, this movement amounts to a movement of the pin or guarding device with respect to the guarding device or the pin, respectively. In the modification shown in Figs. 1 to 4, inclusive, the latch moves with respect to both the pin and the other guarding device. With the pin or movable leg of the safety pin out of engagement with the locking or latching device, the pin may be opened in the usual manner; and when it is desired to lock it in closed position, relative rotation of the latch and pin are accomplished in the opposite direction to secure the pin closed.

Since the generally circular guard on the pin is of diameter not less than one inch, it is too large for a baby to swallow; and even though the infant should get the pin and put it in his mouth, he will be unable to swallow it.

While I have chosen to show my invention by illustrating and describing a preferred embodiment of it, I have done so by way of example only, as I am aware that there are many modifications and adaptations which can be made by one skilled in the art within the scope of the invention.

Having thus complied with the statutes and shown and described the preferred embodiment of my invention, what I consider new and desire to have protected by Letters Patent is pointed out in the appended claims.

What is claimed is:

1. As an article of manufacture, a swallow-proof safety pin comprising: a stationary leg; a movable leg biased to move away from the stationary leg; a keeper fixed on said stationary leg and engaging the movable leg to hold it substantially parallel to the stationary leg when the pin is closed; a relatively large generally planar member attached to the stationary leg and extending laterally therefrom in both directions, said member being large enough to prevent swallowing the pin by a baby; and a locking means integral with the planar member and rotatable around the stationary leg as an axis and engageable with the movable leg to prevent its movement towards the stationary leg and out of engagement with the keeper thereby to prevent accidental opening of the safety pin.

2. A swallow-proof safety pin as claimed in claim 1, in which the planar member is plastic and the stationary leg of the pin extends through the member and permits relative movement of the planar member and pin around the stationary member as an axis and in which the locking means is integral with the planar member.

References Cited in the file of this patent

UNITED STATES PATENTS

| | | |
|---|---|---|
| 607,123 | McVay | July 12, 1898 |
| 645,108 | Lincks | Mar. 13, 1900 |
| 825,579 | Bryant | July 10, 1906 |
| 859,797 | Bechtold | July 9, 1907 |
| 866,379 | Monroe | Sept. 17, 1907 |
| 967,802 | Marshak | Aug. 16, 1910 |
| 2,233,247 | Dies | Feb. 25, 1941 |